J. A. GERMONPREZ.
COTTER PIN.
APPLICATION FILED FEB. 7, 1911.

996,756.

Patented July 4, 1911.

Witnesses
Chas. W. Stauffiger.
F. E. Ernst

Inventor
John A. Germonprez
By Barthel & Barthel
Attorneys

UNITED STATES PATENT OFFICE.

JOHN A. GERMONPREZ, OF DETROIT, MICHIGAN.

COTTER-PIN.

996,756.   Specification of Letters Patent.   Patented July 4, 1911.

Application filed February 7, 1911. Serial No. 607,065.

*To all whom it may concern:*

Be it known that I, JOHN A. GERMONPREZ, a citizen of the United States of America, residing at Detroit, in the county of Wayne and State of Michigan, have invented certain new and useful Improvements in Cotter-Pins, of which the following is a specification, reference being had therein to the accompanying drawings.

This invention relates to an improved cotter or split pin and its object is to so form such a pin that when it is driven into an opening through a rod or shaft, its projecting ends will automatically spread apart and hold the pin against being accidentally detached.

Figure 1:
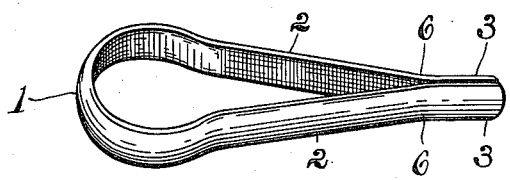
Figure 2:
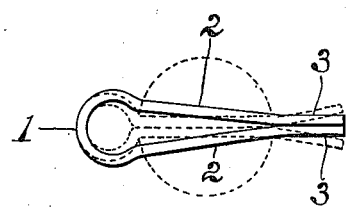
Figure 3:
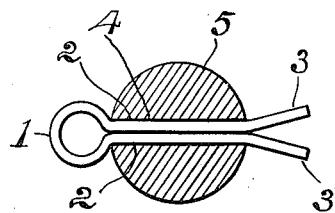

To this end the invention consists in the matters hereinafter set forth and more particularly pointed out in the claim reference being had to the accompanying drawing in which, Figure 1 is a perspective view of a split-pin embodying the invention; Fig. 2 is an edge elevation of the same; and Fig. 3 is a like view showing the pin in place within an opening through a shaft.

Cotters or split pins of this character are commonly used as fore-locks for bolts, shafts etc., to hold the same against longitudinal movement or to hold other parts in place upon the shaft or rod, and these pins are usually formed, as is the one embodying the present invention, of a length of rod or wire which is bent intermediate its ends into an eye with parallel arms extending laterally from the eye to pass through a transverse hole in a rod or shaft. As commonly formed, the laterally-extending arms lie in contact throughout their length so that the key may be slipped through the hole in the shaft, but it is then necessary to insert a tool between the projecting ends and spread the same apart to lock the key in place.

In the construction shown in the drawing, a cotter pin is formed from a single piece of metal rod, bar or wire which is bent intermediate its ends into an open loop or eye 1 with arms 2 extending laterally from the open side of the loop, said arms converging toward their outer end portions 3, which end portions lie in contact with each other or nearly so, so that said ends may be readily inserted in an opening 4 in a rod or shaft 5. When so inserted, the pin may be driven through the opening and the sides of the connecting portions 2 of the arms, coming in contact with the sides of the opening, will force the arms toward each other, closing the loop. When fully driven in, the end portions 3 of the arms will project through the shaft and, owing to the bends 6 which are formed in the arms at the meeting of their portion 2 and 3, said projecting end portions 3 will spring apart and thus automatically lock the cotter within the opening in the shaft without the necessity for inserting a tool between the ends and spreading them apart. If it is desired to further insure the securing of the pin in place, the end portions 3 may be readily further bent without inserting a tool between the ends, as they spring apart as soon as projected through the hole in the shaft.

The fore-lock or split pin is shown in the drawings as made from a wire or rod flattened at its inner side but I do not wish to limit myself to the form of material from which the pin is made, and obviously changes may be made in the construction without departing from the spirit of my invention.

What I claim is:

A cotter pin comprising a rod bent intermediate its ends into an eye with separated out-turned ends forming arms which are normally convergent from the eye outwardly throughout a portion of their length, and parallel and in contact with each other throughout their outer end portions, the said inner and outer portions of each of said arms meeting at an angle to each other, said angles forming a fulcrum on which the contacting arms rock when the inner portions of the arms are forced toward each other.

In testimony whereof I affix my signature in presence of two witnesses.

JOHN A. GERMONPREZ.

Witnesses:
C. R. STICKNEY,
A. M. SHANNON.